(12) United States Patent
Lei (10) Patent No.: US 10,404,087 B2
(45) Date of Patent: Sep. 3, 2019

(54) ELECTRICAL CONNECTION DEVICE COMPRISING VOLTAGE DETECTING UNIT AND POLARITY DETECTING UNIT

(71) Applicant: Shenzhen Carku Technology Co., Ltd., Shenzhen (CN)

(72) Inventor: Yun Lei, Shenzhen (CN)

(73) Assignee: SHENZHEN CARKU TECHNOLOGY CO., LTD., Shenzhen (CN)

( * ) Notice: Subject to any disclaimer, the term of this patent is extended or adjusted under 35 U.S.C. 154(b) by 151 days.

(21) Appl. No.: 15/253,851

(22) Filed: Aug. 31, 2016

(65) Prior Publication Data
US 2017/0194120 A1 Jul. 6, 2017

(30) Foreign Application Priority Data

Dec. 31, 2015 (CN) .......................... 2015 1 1031172
Dec. 31, 2015 (CN) .......................... 2015 1 1031200

(51) Int. Cl.
*H02J 7/00* (2006.01)
*H01H 47/00* (2006.01)
*B60R 16/03* (2006.01)

(52) U.S. Cl.
CPC ............ *H02J 7/0054* (2013.01); *B60R 16/03* (2013.01); *H01H 47/001* (2013.01); *H02J 7/0034* (2013.01)

(58) Field of Classification Search
CPC .................................................. H02J 7/0034
See application file for complete search history.

(56) References Cited

U.S. PATENT DOCUMENTS

| | | | | |
|---|---|---|---|---|
| 4,366,430 A | * | 12/1982 | Wright .................. | G01R 19/14 320/105 |
| 4,463,402 A | * | 7/1984 | Cottrell ................. | H02J 7/0034 320/105 |
| 4,769,586 A | * | 9/1988 | Kazmierowicz ...... | H02J 7/0034 307/10.1 |
| 4,855,662 A | * | 8/1989 | Yang ..................... | H02J 7/0034 320/103 |

(Continued)

FOREIGN PATENT DOCUMENTS

EP 0756367 A2 * 1/1997 ............ H02J 7/0034

*Primary Examiner* — Rexford N Barnie
*Assistant Examiner* — David A Shiao
(74) *Attorney, Agent, or Firm* — Jun He Law Offices P.C.; James J. Zhu (57) ABSTRACT

An electrical connection device is provided which comprises: a first wire port comprising a first terminal and a second terminal; a second wire port comprising a third terminal and a fourth terminal; a switch assembly being electrically coupled between the first wire port and the second wire port, wherein the switch assembly comprises a first switch operable to couple the first terminal to the third terminal or the fourth terminal, a second switch operable to couple the second terminal to the third terminal and a third switch operable to couple the second terminal to the fourth terminal; a polarity detecting unit configured to detect a first polarity between the first terminal and the second terminal and a second polarity between the third terminal and the fourth terminal and generate a first polarity signal and a second polarity signal respectively; a main processing unit configured to receive the first polarity signal and the second polarity signal to control the switch assembly.

10 Claims, 11 Drawing Sheets

(56) References Cited

U.S. PATENT DOCUMENTS

| | | | | | |
|---|---|---|---|---|---|
| 4,871,957 | A | * | 10/1989 | Taranto | H01R 11/24 320/105 |
| 5,103,155 | A | * | 4/1992 | Joannou | H02J 7/0034 320/105 |
| 5,189,359 | A | * | 2/1993 | Kronberg | H02J 7/0034 320/103 |
| 6,262,492 | B1 | * | 7/2001 | Sheng | H02J 7/0034 307/10.1 |
| 6,632,103 | B1 | * | 10/2003 | Liu | H02J 7/0034 320/105 |
| 2002/0155752 | A1 | * | 10/2002 | Winkle | H01M 10/4207 439/504 |
| 2004/0066168 | A1 | * | 4/2004 | George | H02J 7/0034 320/105 |
| 2005/0110467 | A1 | * | 5/2005 | Thomason | H02J 7/0031 320/165 |
| 2009/0039712 | A1 | * | 2/2009 | Czarnyszka | F02N 11/12 307/127 |
| 2010/0173182 | A1 | * | 7/2010 | Baxter | H01M 10/42 429/61 |
| 2016/0001666 | A1 | * | 1/2016 | Nook | H02J 7/0054 320/105 |
| 2016/0049819 | A1 | * | 2/2016 | Butler | H02J 7/0054 320/105 |

* cited by examiner

ELECTRICAL CONNECTION DEVICE COMPRISING VOLTAGE DETECTING UNIT AND POLARITY DETECTING UNIT

CROSS-REFERENCE TO RELATED APPLICATION

The present application claims priority to Chinese Patent Application No. 201511031200.4 filed Dec. 31, 2015 and Chinese Patent Application No. 201511031172.6 filed Dec. 31, 2015, the entire content of which are incorporated herein by reference.

FIELD OF INVENTION

The present invention relates to electrical connection devices, in particular, to devices for providing electrical connection between two power supplies.

BACKGROUND

Storage battery is an essential part of a vehicle. It provides not only a powerful starting current (generally up to 200 A~600 A) for the engine, but also an operating voltage for the instruments or other devices within the vehicle (for example, when the engine is idling or stops). Typically, during the operation of the engine, when the voltage of the generator is higher than the voltage of the storage battery, the storage battery will convert part of the electrical energy into chemical energy for storage (so called charging) so that the battery always maintains sufficient power.

But sometimes, the battery may be over-discharged and become insufficient in power because of the negligence of the driver. For example, when the driver leaves the vehicle without turning off the lights or other electrical equipment, or if a vehicle is left unused for a long time, the battery will die. As another example, the battery performance may significantly drop after long-time use because of consumption of the chemicals inside of battery.

However, no matter what is the cause of insufficient battery power, the driver has to endure great inconveniences, e.g., the engine of the vehicle cannot be started. Once this happens, it is common to borrow power from another vehicle (referred as a "rescuing vehicle" hereinafter) and connect 1 battery of said rescuing vehicle to the insufficient power battery via a set of wires for emergent charging.

In prior art, the set of wire typically includes two separate wires and each end of the wires is provided with a clip. In order to establish a circuit between the two batteries, it is required to connect each pole of one battery with the corresponding pole having the same polarity of the rescuing vehicle's battery (that is, positive to positive; negative to negative). However, there is a high risk in the process that, if the battery polarity is mistaken, the two batteries would be in a reverse connection state which is apt to produce sparks and even cause explosion and other damages or injuries. Furthermore, if the operating voltages of the two batteries do not match, the vehicle may incur damages and other risks.

SUMMARY

The objective of the present invention is to provide an improved electrical connection device to solve at least one problem of the prior art technology.

In one embodiment, an electrical connection device is provided which comprises: a first wire port comprising a first terminal and a second terminal; a second wire port comprising a third terminal and a fourth terminal; a switch assembly being electrically coupled between the first wire port and the second wire port, wherein the switch assembly comprises a first switch operable to couple the first terminal to the third terminal or the fourth terminal, a second switch operable to couple the second terminal to the third terminal and a third switch operable to couple the second terminal to the fourth terminal; a polarity detecting unit configured to detect a first polarity between the first terminal and the second terminal and a second polarity between the third terminal and the fourth terminal and generate a first polarity signal and a second polarity signal respectively; a main processing unit configured to receive the first polarity signal and the second polarity signal to control the switch assembly.

Preferably, the polarity detecting unit comprises a first optocoupler configured to detect the first polarity and a second optocoupler configured to detect the second polarity.

Preferably, the main processing unit is further configured to send a control signal to the switch assembly to couple the first terminal and the second terminal to the third terminal and the fourth terminal respectively when the first polarity is identical with the second polarity; and send a control signal to the switch assembly to couple the first terminal and the second terminal to the fourth terminal and the third terminal respectively when the first polarity is different from the second polarity.

Preferably, the electrical connection device further comprises a power unit configured to obtain a current from the first terminal or the third terminal and supply the current to the main processing unit, the polarity detecting unit and/or the switch assembly.

Preferably, the first wire port is connected to an onboard power unit of a vehicle engine and the second wire port is connected to an external power supply, wherein the external power supply may provide electricity to the onboard power unit.

Preferably, the electrical connection device further comprises an ignition detecting unit configured to detect an ignition of the vehicle engine and generate an ignition signal to the main processing unit.

Preferably, the main processing unit is configured such that, when the first wire port is coupled electrically to the second wire port via the switch assembly and an ignition signal is detected, the main processing unit outputs a control signal to the switch assembly to keep the electrical coupling between the first wire port and the second wire port.

Preferably, the main processing unit is configured such that, when the first wire port is coupled electrically to the second wire port via the switch assembly but no ignition signal is detected, the main processing unit outputs a control signal to the switch assembly to maintain the electrical coupling between the first wire port and the second wire port for a first time period, and then disconnect the electrical coupling for a second time period, and then resume the electrical coupling.

Preferably, the first time period is no less than three seconds and the second time period is less than one second.

Preferably, the main processing unit is further configured to, before resuming the electrical coupling, receive newly detected polarity signals to control the switch assembly.

In another embodiment, an electrical connection device is provided which comprises: a first wire port operable to be coupled to a first power; a second wire port operable to be coupled to a second power; a switch assembly electrically coupled between the first wire port and the second wire port, the switch assembly is operable to connect or disconnect an electrical connection between the first wire port and the second wire port; a voltage detecting unit configured to detect the voltage of the first power and the voltage of the second power and generate a first voltage signal and a second voltage signal respectively; a main processing unit configured to receive the first voltage signal and the second voltage signal and, when the first voltage signal and the second voltage signal are in the same predetermined voltage range, output an corresponding operating signal to control the switch assembly.

Preferably, the predetermined voltage range is between 14.4V to 25.4V or between 8.1 to 12.7V.

Preferably, the electrical connection device further comprises an indication unit; wherein the main processing unit is configured to control the indication unit to send an alarm when the first voltage signal and the second voltage signal are not in the same predetermined voltage range.

Preferably, the indication unit comprises a warning light and/or a buzzer.

Preferably, the corresponding operating signal enables the switch assembly to couple electrically the first wire port to the second wire port.

Preferably, the electrical connection device further comprises a polarity detecting unit; wherein the first wire port includes a first terminal and a second terminal, the second wire port includes a third terminal and a fourth terminal; and wherein the corresponding operating signal enables the polarity detecting unit to detect a first polarity between the first terminal and second terminal and a second polarity between the third terminal and the fourth terminal and generate a first polarity signal and a second polarity signal respectively.

Preferably, the switch assembly comprises a first switch operable to couple the first terminal to the third terminal or the fourth terminal, a second switch operable to couple the second terminal to the third terminal and a third switch operable to couple the second terminal to the fourth terminal; and wherein the main processing unit is configured to receive the first polarity signal and the second polarity signal to control the first switch, the second switch and the third switch.

Preferably, the main processing unit is further configured to: send a control signal to the switch assembly to couple the first terminal and the second terminal to the third terminal and the fourth terminal respectively when the first polarity is identical with the second polarity; and send a control signal to the switch assembly to couple the first terminal and the second terminal to the fourth terminal and the third terminal respectively when the first polarity is different from the second polarity.

Preferably; the first switch; the second switch and the third switch are relays; and the switch assembly further comprises driving units for operating the first switch; the second switch and the third switch.

The foregoing has outlined, rather broadly; features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be fully understood by reading the following description by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION

The following detailed description refers to the accompanying drawings which are part of the present application. The illustrative embodiments described in the detailed description, the accompanying drawings and the claims are not limiting, and other embodiments may be adopted, or modifications may be made without deviating from the spirit and scope of the present application. It should be understood that the various aspects of the present application described and graphically presented herein may be arranged, replaced, combined, divided and designed in many different configuration, and these different configurations are implicitly comprised in the present application.

Figure 1:
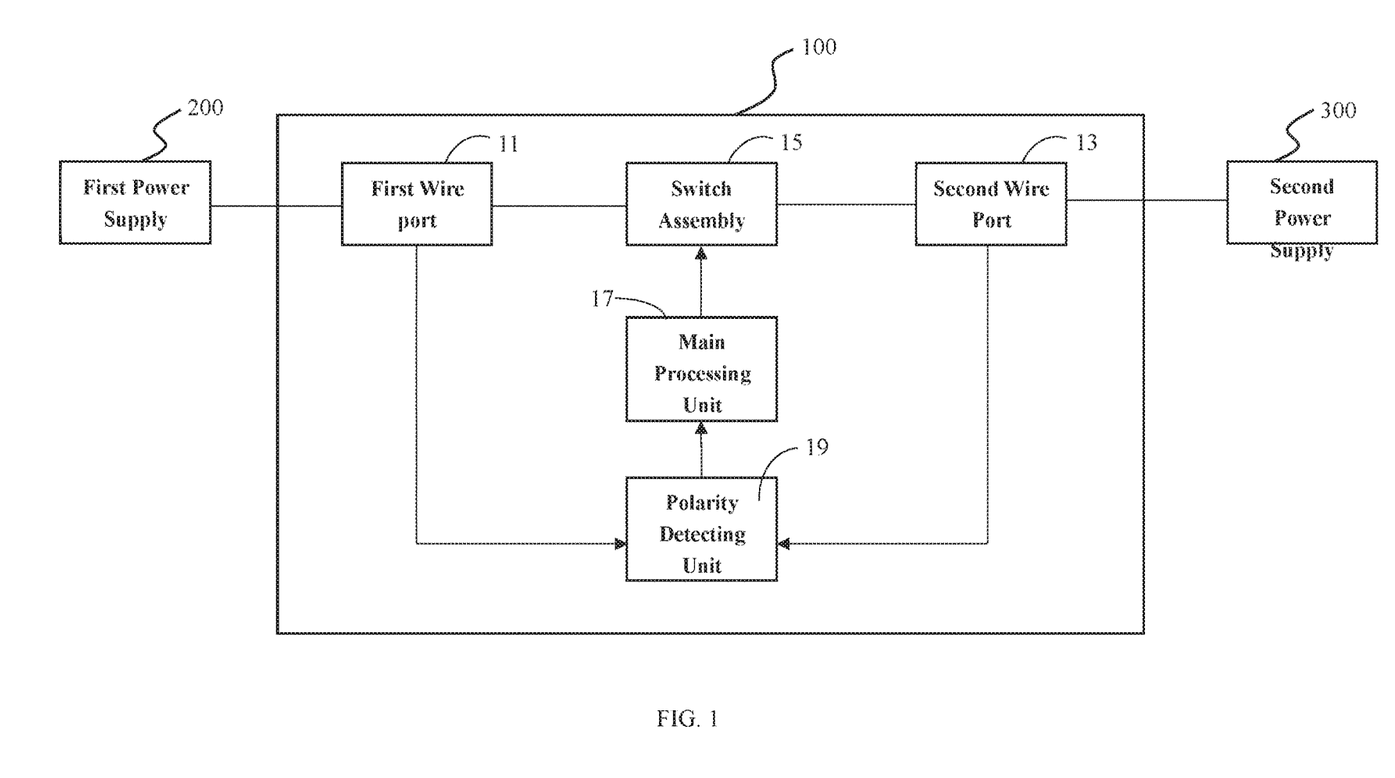
FIG. 1 is a schematic view of an electrical connection device according to a first embodiment of the present invention.

FIGS. 1-4 illustrate an exemplary electrical connection device 100 according to the invention. Referring to FIG. 1, the electrical connection device 100 is used to electrically connect a first power supply 200 with a second power supply 300. In addition, the electrical connection device 100 can prevent the error connection between the first power supply 200 and the second power supply 300 so as to improve safety standard. As an example, the first power supply 200 is an onboard power such as a storage battery for the ignition system of a vehicle, and the second power supply 300 is an external power, such as a battery from a rescuing vehicle. The electrical connection device 100 is configured to enable the external power to supply electrical power to the onboard power of the vehicle. It should be understood that the electrical connection device according to the invention may also be used to connect a variety of circuits or power supplies other than a storage battery.

The electrical connection device 100 includes a first wire port 11, a second wire port 13, a main processing unit 17, a polarity detecting unit 19 and a switch assembly 15. Both the first wire port 11 and the second wire port 13 are electrically coupled to the switch assembly 15. The polarity detecting unit 19 is configured to detect the polarity of the first wire port 11 and the second wire port 13 and generate corresponding polarity signals. The main processing unit 17 is configured to receive the polarity signals and control the switch assembly 15 based on the received polarity signals to change the coupling relationship between the first wire port 11 and the second wire port 13, thereby controlling the electrical connection between the first power supply 200 and the second power supply 300.

Figure 2:
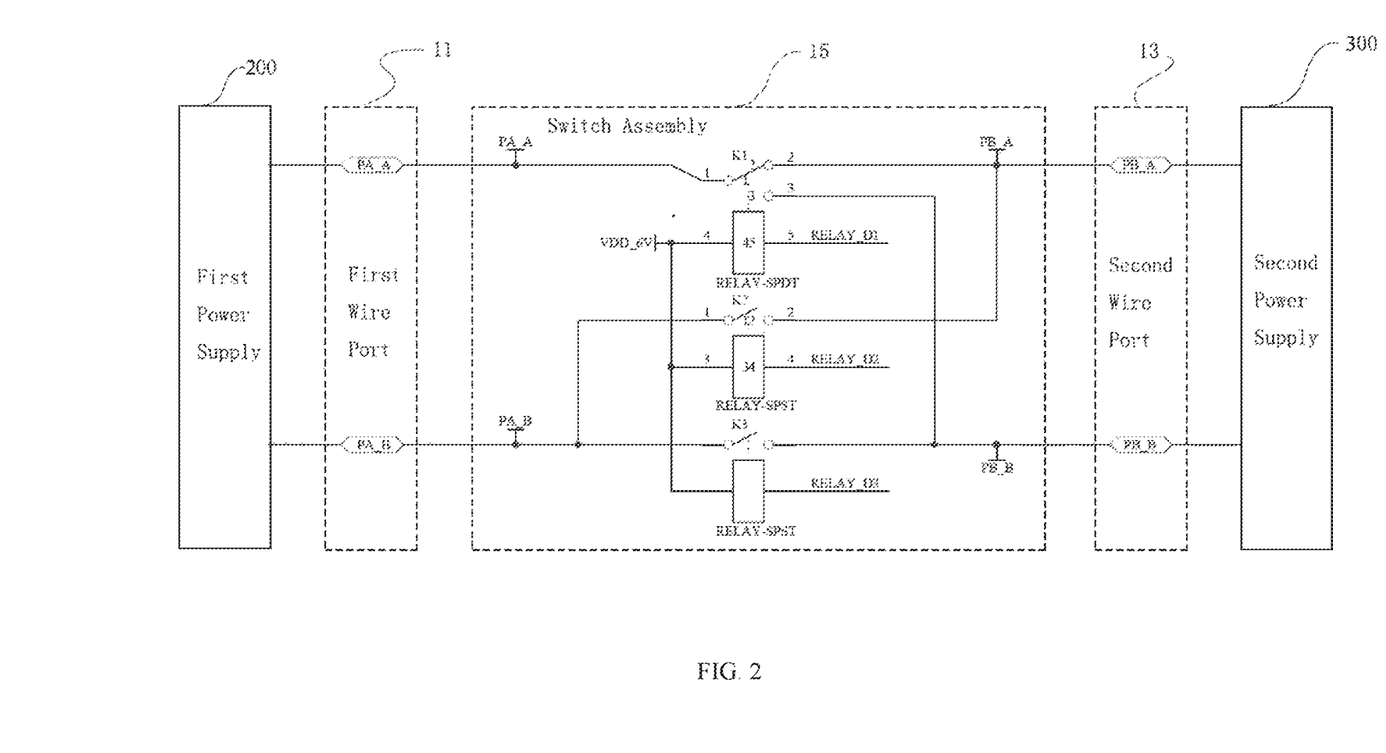
FIG. 2 shows the switch asset bly, the wiring ports of FIG. 1 in more details and their connection.

FIG. 2 illustrates in more details the switch assembly 15, the first wire port 11, and the second wire port 13 in FIG. 1. As shown, the first wire port 11 includes a first terminal PA_A and a second terminal PA_B, and the second wire port 14 includes a third terminal PB_A and a fourth terminal PB_B. FIG. 2 also shows that the switch assembly 15 comprises a first switch K1 operable to selectively couple the first terminal PA_A to the third terminal PB_A or the fourth terminal PB_B, a second switch K2 operable to couple the second terminal PA_B to the third terminal PB_A, and third switch K3 operable to couple the second terminal PA_B to the fourth terminal PB_B. The operation of each of the switches is controlled by the main processing unit 100, as will be explained in more detail below.

Figure 3:
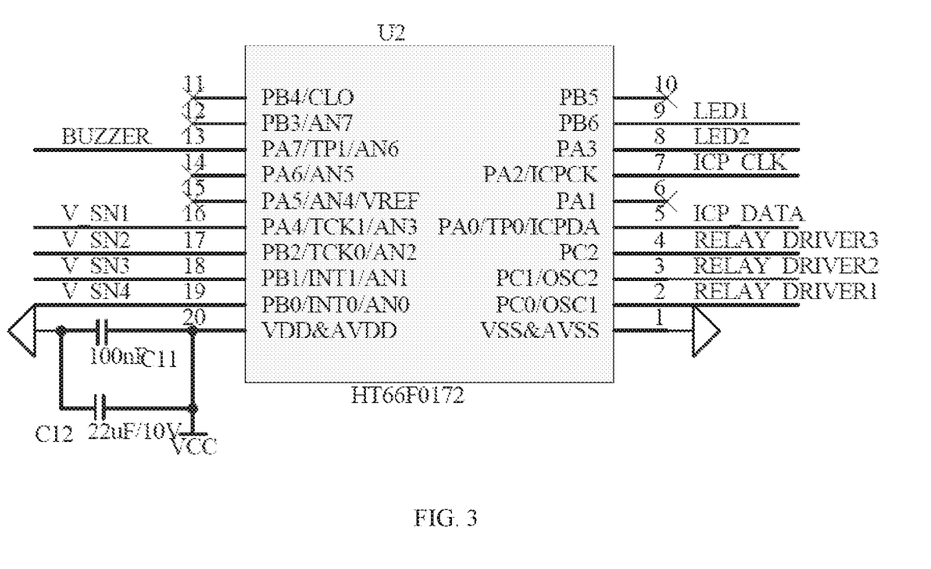
FIG. 3 is a circuit schematic diagram of the main processing unit in FIG. 1.

An exemplary embodiment of the main processing unit 17 is shown in FIG. 3 in which the main processing unit 17 is a microcontroller HT66F0172. The main processor unit 17 includes a chip (referred as "U2" in FIG. 3) with a plurality of input pins and output pins, such as the first input pin V_SN3 and a second input pin V_SN4. The chip U2 is electrically connected with a plurality of units of the device 100 through corresponding pins. It should be understood that, within the principle and scope of the present invention, one skilled in the art may also be capable of selecting other type of controller or processor to meet a specific need of control.

Figure 4A:
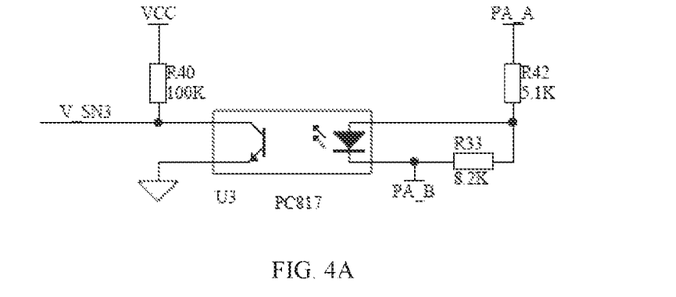
FIGS. 4A-4B are circuit schematic diagrams of the polarity detecting unit in FIG. 1.
Figure 4B:
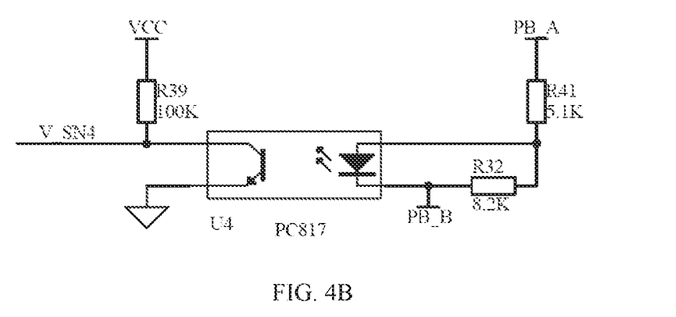

Next, referring to FIG. 4A and FIG. 4B, an illustrative diagram of the polarity detecting unit 19 is shown, wherein the circuit in FIG. 4A is for detecting the polarity of the first wire port 11 and the circuit in FIG. 4B is for detecting the polarity of the second wire port 13. Similarly, the polarity detecting unit in FIGS. 4A and 4B are illustrated by way of example only. One skilled in the art may understand that, according to the spirit and principle of the present invention, other different circuits may be used to achieve the function of polarity detection.

The circuit in FIG. 4A comprises a first optocoupler U3 with a primary side and a secondary side. The primary side is coupled to the first terminal PA_A and the second terminal PA_B, the secondary side is connected to the pin V_SN3 of the main processing unit 17. When the terminal PA_A is connected to the positive pole of the first power supply 200 and the second terminal PA_B is connected to the negative pole of first power supply 200, the primary side of the first optocoupler U3 is turned on and the secondary side will also be turned on, and a low voltage level is output to the main processing unit 17 as a polarity signal. On the contrary, when the terminal PA_A is connected to the negative pole of the first power supply and the second terminal PA_B is connected to the positive pole of the first power supply, the primary side of the first optocoupler U3 is turned off and the secondary side will also be turned off, and a high voltage level is output to the main processing unit 17 as a polarity signal.

Similarly, the detecting circuit in FIG. 4B comprises a second optocoupler U4 with a primary side and a secondary side. The primary side is connected to the third terminal PB_A and the fourth terminal PB_B and the secondary side is connected to the pin V_SN4 of the main processing unit 17. When the third terminal PB_A is connected to the positive pole of the second power supply and the fourth terminal PB_B is connected to the negative pole of the second power supply, the primary side of the second optocoupler U4 is turned on and the secondary side also will be turned on, and a low voltage level output to the main processing unit 17 as a polarity signal. On the contrary, when the third terminal PB_A is connected to the negative pole of the second power supply and the fourth terminal PB_B is connected to the positive pole of the second power supply, the primary side of the second optocoupler U4 is turned off and the secondary side will also be turned off, and a high voltage level s output to the main processing unit 17 as a polarity signal.

It can be seen from FIGS. 1-4 that, after the polarity detecting unit 19 generates polarity signals of the first wire port 11 and the second wire port 13 and sends the polarity signals to the main processing unit 17, if the main processing unit 17 determines that the polarity signals received in the first pin V_SN3 and the second pin V_SN4 are same, the main processing unit 17 outputs a control signal to the switch assembly 15 to couple the first terminal PA_A to the third terminal PB_A and the second terminal PA_B to the fourth terminal PB_B. However, if the main processing unit 17 determines that the polarity signals received in the pins V_SN3 and V_SN4 are different, a control signal is output to the switch assembly 15 to couple the first terminal PA_A to the fourth terminal PB_B, and the second terminal PA_B to the third terminal PB_A. Thus, the electrical connection device 100 of the present invention can automatically switch the electric connection between the respective terminals. In this way, the first power supply 200 and the second power supply 300 are guaranteed to be electrically connected correctly irrespective of the physical coupling relationship between the terminals of the wire ports and the poles of the power supplies. It prevents the first and second power supplies 200, 300 to be connected to each other with reverse polarity.

Figure 5:
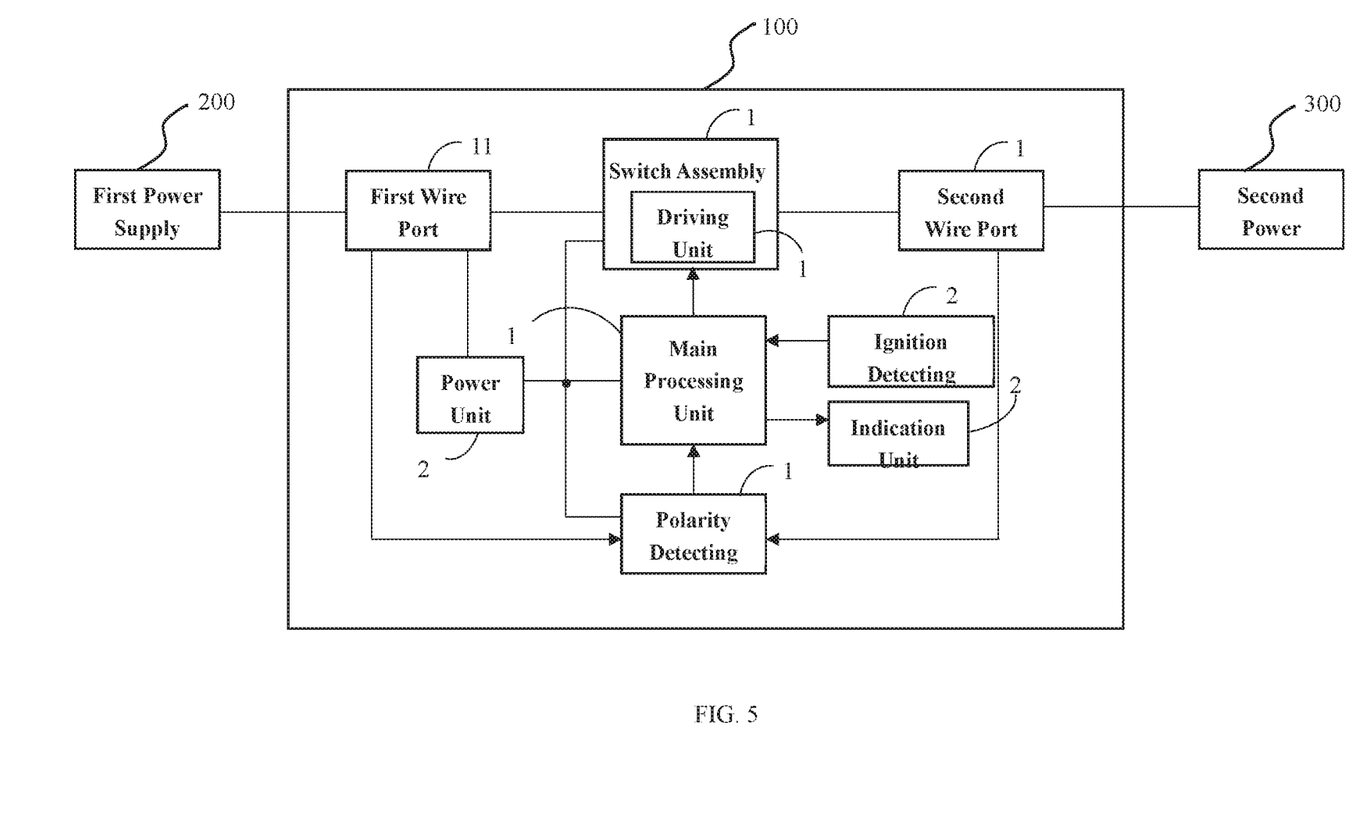
FIG. 5 is a schematic view of the electrical connection device according to a second embodiment of the present invention.

FIGS. 5-9 show an electrical connection device 100 according to a second embodiment of the present invention. Referring to FIG. 5, it can be seen that, compared with the embodiment shown in FIG. 1, the electrical connecting device shown in FIG. 5 additionally comprises a plurality of units, including a power unit 21, a driving unit 16, an ignition detecting unit 23, and an indication unit 25.

Figure 6:
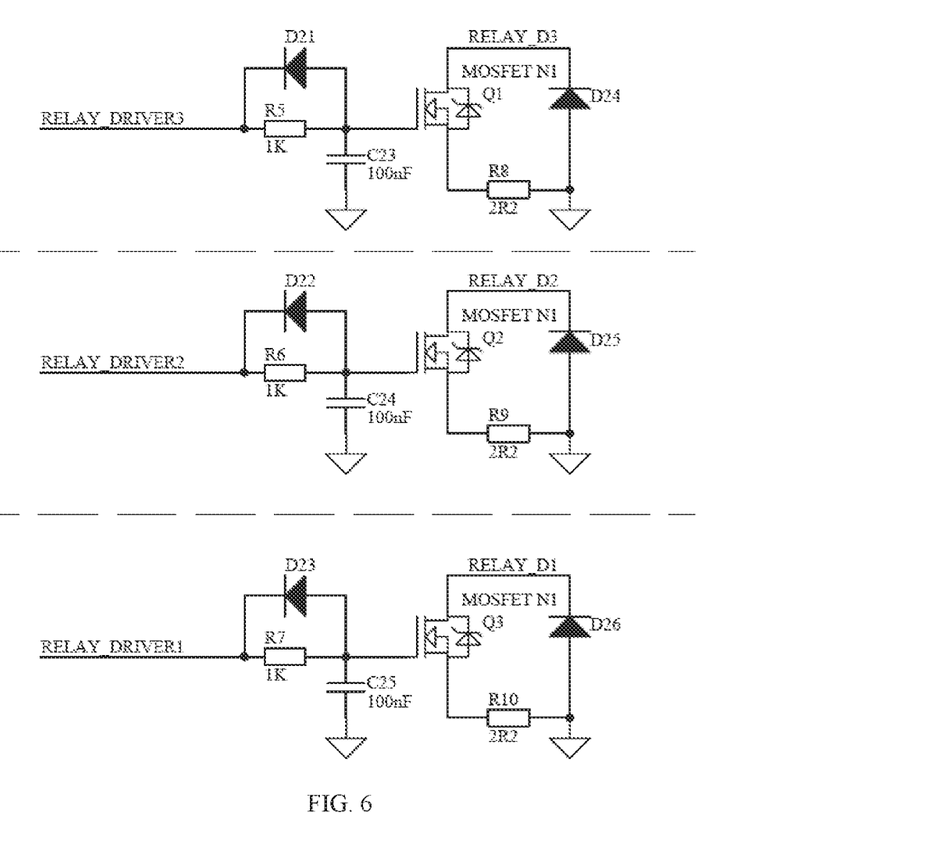
FIG. 6 is a circuit schematic diagram of the switch driving unit in FIG. 5.

FIG. 6 shows a circuit schematic diagram for the driving unit 16. The driving unit 16 is configured to control the switches of the switch assembly 15 according to the control signals from the main processing unit 17. In the embodiment, each of the switches K1, K2 and K3 is provided with a relay which may be controlled according to control signals from the main processing unit 17. As shown in FIG. 6, the control signals RELAY_DRIVER1, RELAY_DRIVER2 and RELAY_DRIVER3 from the main processing unit 17 are converted into the drive signals RELAY_D1, RELAY_D2, RELAY_D3 via MOS transistor Q1, Q2, Q3 in the driving unit 16 to control the relays of the switches K1, K2 and K3, respectively.

Figure 7A:
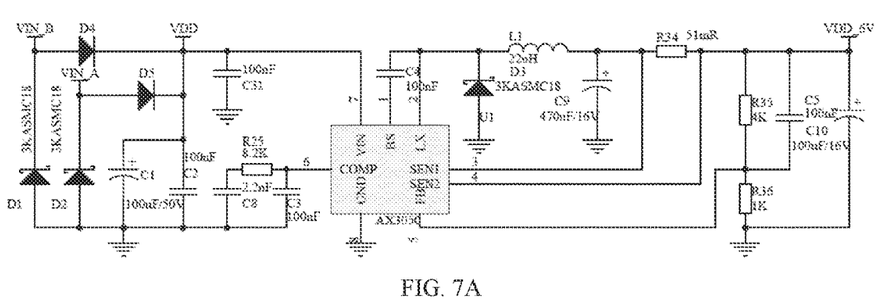
FIGS. 7A-7B are circuit schematic diagrams of the power unit in FIG. 5.
Figure 7B:
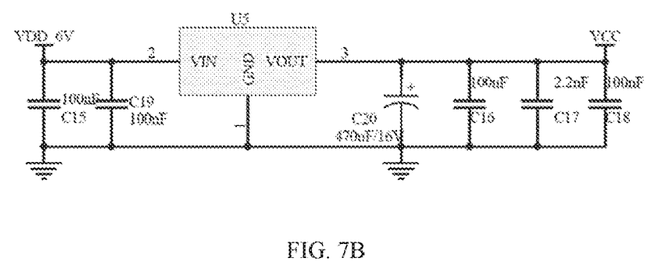

FIGS. 7A and 7B show circuit schematic diagrams for an exemplary power unit 21. The power unit 21 is configured to obtain a current from the first terminal PA_A or the third terminal PB_A and convert and supply it to the main processing unit 17, the polarity detecting unit 19, the driving unit 16 or the switch assembly 15. Referring to FIGS. 2, 5 and 7, the first switch K1 connects the first terminal PA_A and the third terminal PB_A in a default state (e.g., from the starting of the main processing unit 11 to the output of control signal), and the power unit 21 is connected to the first terminal PA_A or third terminal PB_A to receive a current. In the power unit 21, as shown in FIG. 7A, the current from the first terminal PA_A or the third terminal PB_A is regulated and then stepped down and filtered via the chip AX3050 into VDD_6V to be provided to the switch assembly 15. FIG. 7B illustrates that the VDD_6V may further be DC-converted by the chip U5 into VCC to be provided to the main processing unit 17 and the polarity detecting unit 19.

Figure 8:
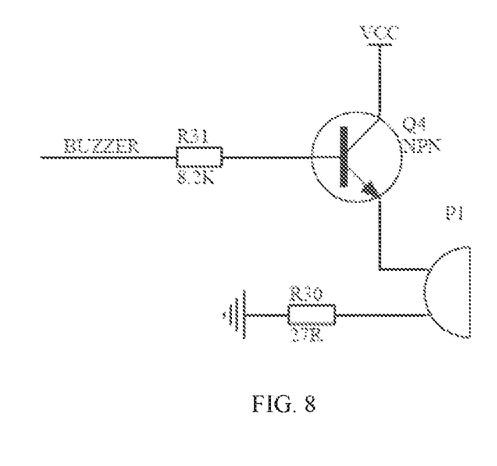
FIG. 8 is a circuit schematic diagram of one example of the indication unit in FIG. 5.
Figure 9:
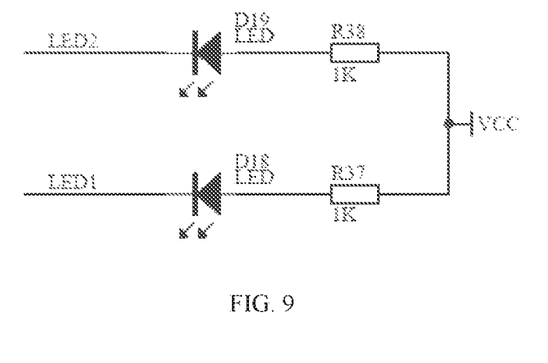
FIG. 9 is a circuit schematic diagram of another example of the indication unit in FIG. 5.

FIGS. 8 and 9 illustrate two examples of the indication unit 25 in FIG. 5. The indication unit 25 is configured to send out perceivable signs according to a control signal from the main processing unit 17. For example, the indication unit 25 may sent out a connection sign when the first wire port 11 and the second wire port 13 are connected correctly, or a warning sign when there is an abnormal connection between the first wire port 11 and the second wire port 13. The abnormal connection includes the following situations: for example, the first terminal PA_ B and the second terminal PA_A are in short circuit, the switch assembly 15 fails, or any of the terminals falls off and the like. Alternatively or in addition, the main processing unit 17 may output a control signal to the switch assembly 15 to restore a default turning-off state while the indication unit 25 issues an warning sign.

In particular, the indication unit 25 may include LED indicators and/or buzzers. FIG. 8 is a circuit diagram for the buzzer wherein the transistor Q4 NPN receives a control signal BUZZER from the main processing unit 17 to control the operation of the buzzer. FIG. 9 is a circuit diagram of the LED indicators in which the green LED D19 and the red LED D18 receives control signals LED1 and LED2 respectively from the main processing unit 17 to control the work of the lights D18 and D19. The indication unit 25 may be configured that, when the four terminals are connected correctly and the switch assembly 15 completes the controlled couplings, the green LED D18 turns on, the red LED D19 turns off and the buzzer mutes, indicating that the electrical connection device 100 properly couples the first power supply 200 to the second power supply 300.

The ignition detecting unit 23 shown in FIG. 5 is used for detecting ignition status after the electrical connection device 100 connects an onboard battery of a vehicle to an external power supply. The ignition detecting unit 23 is configured to detect the ignition of the engine of the vehicle bases on the signal from the vehicle (e.g., the vehicle's ignition system, ECU or the like), and sends an ignition signal to the main processing unit 17 upon detecting the ignition of the vehicle engine.

The ignition detecting unit 23 may be any suitable electrical element or circuit which receives, processes and transmits the ignition signal. For example, the ignition detecting unit can simply be configured as a control signal transmission circuit coupled with both the ignition system of the engine and the main processing unit 17. When a driver starts the engine by sending an ignition signal to the ECU, the same ignition signal will be detected by the ignition detecting unit and sent to the main processor unit 17. Alternatively, the ignition detecting unit 23 may include a voltage conversion circuit which may convert the ignition voltage into an ignition signal to be sent to the main processor unit 17.

With the ignition status, the main processing unit 17 is configured such that, when the first wire port 11 is coupled electrically to the second wire port 13 and an ignition signal is detected, the main processing unit 17 outputs a control signal to the switch assembly 15 to maintain the electrical coupling between the first wire port and the second wire port.

Meanwhile, the main processing unit 17 is further configured such that, when the first wire port 11 is coupled electrically to the second wire port 13 but no ignition signal is detected, the main processing unit 17 will control the switch assembly 15 to maintain the electrical coupling between the first wire port 13 and the second wire port 15 only for a first time period, then disconnect the electrical coupling for a second time period, and then resume the electrical coupling. Preferably, the first time period is no less than three seconds. Preferably, the second time period is less than one second. Further, when it resumes the electrical coupling after said second time period, the polarity signal will be received again from the polarity detection unit, and then the first, second and third switches will be controlled based on the received polarity detection signals. By detecting the polarity at a regular time, it is especially advantageous for avoiding incorrect polarity coupling of the onboard power supply to the external power supply caused by accidents or wrong operations.

Figure 10:
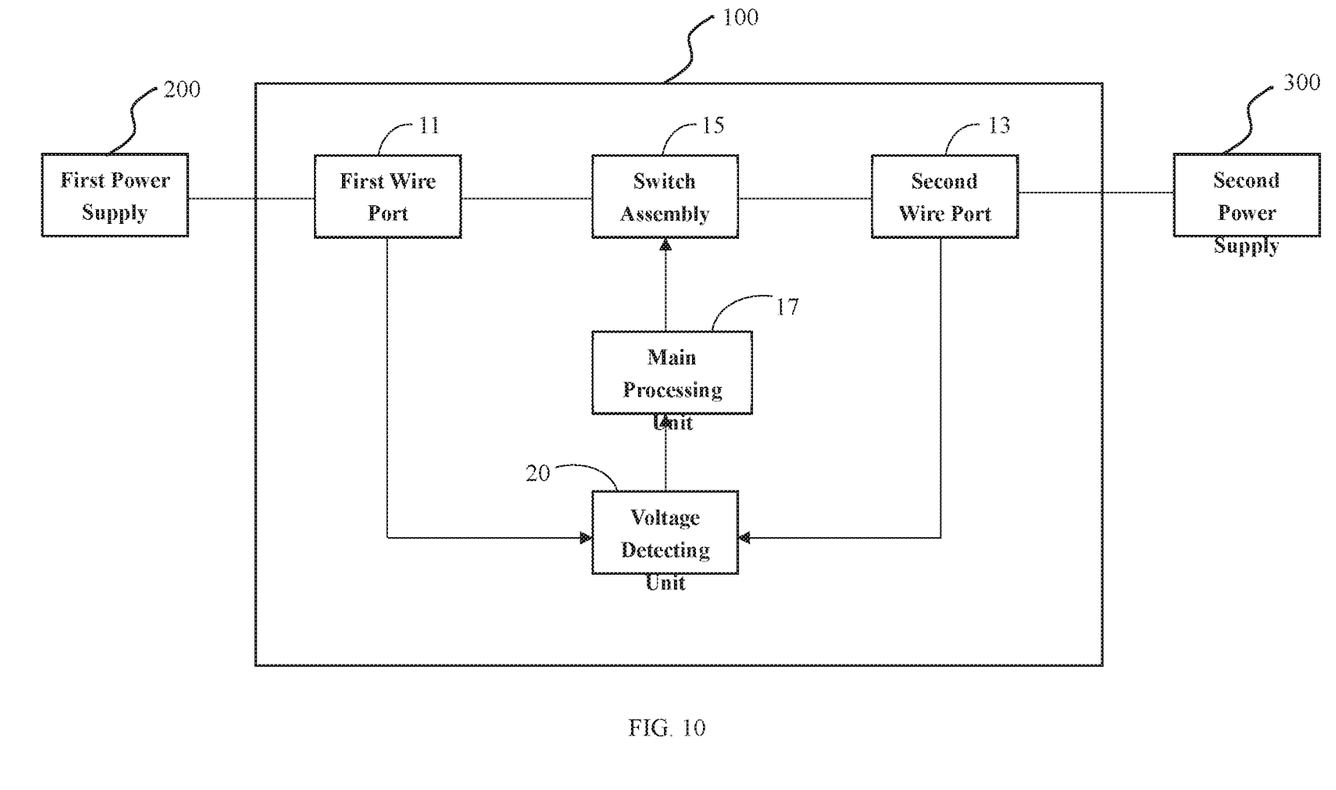
FIG. 10 is a schematic view of the electrical connection device according to a third embodiment of the present invention.

FIG. 10 shows a schematic diagram of the electrical connection device of the present invention according to the third embodiment. Compared with the embodiment shown in FIG. 1, the electrical connection device 10 in FIG. 10 replaces the polarity detecting unit with a voltage detecting unit 20. The voltage detecting unit 20 is configured to detect the voltages of the first power supply 200 and the second power supply 300 and send the detection results as voltage detecting signals to the main processing unit 17. If the main processing unit 17 determines the voltages of the power supply 200 and the power supply 300 match, e.g., they are in a same predetermined range of voltage, an operating signal will be send to the switch assembly 15 to connect the circuit between the first wire port 11 and the send wire port 13. Otherwise, if the main processing unit 17 determines that the first power supply 200 and the second power supply 300 are not in the same predetermined voltage range, no operating signal will be send to the switch assembly 15 so as to maintain a default disconnection between the first wire port 11 and the second wire port 13, thereby avoiding damage to the power supplies or other elements. Typically, the predetermined voltage range are 14.4V-25.4 V (for a 24V battery) or 8.1V-12.7V (for a 12V battery). Preferably, in the embodiment shown in FIG. 10, an indication unit as previously described may be included to issue an alarm when the first power supply 200 and the second power supply 300 are not in the same predetermined voltage range.

Figure 11A:
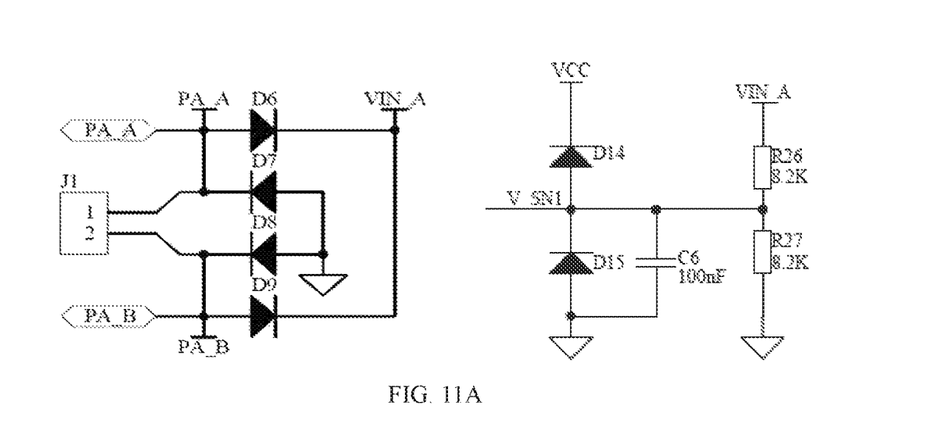
FIGS. 11A-11B are circuit schematic diagrams of the voltage detecting unit in FIG. 10.
Figure 11B:
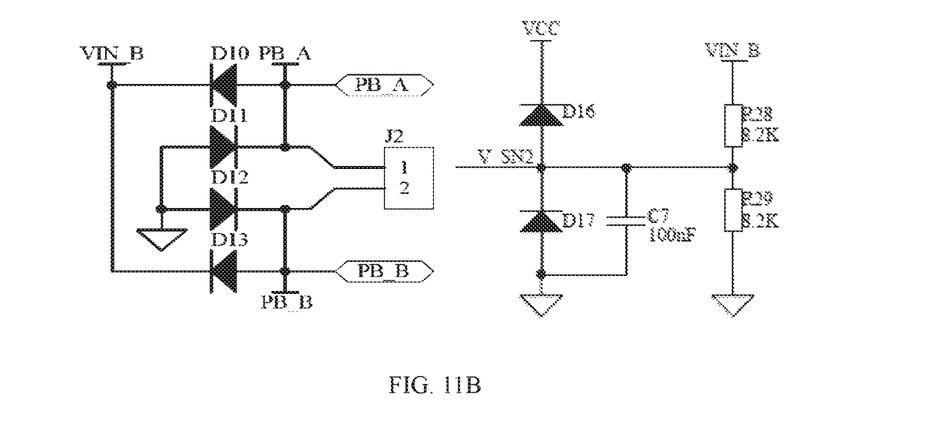

FIG. 11 shows a circuit schematic diagram of the voltage detecting unit 20. As shown, the voltage detecting unit 20 includes a first voltage detecting section (FIG. 11A) for detecting the voltage of the first wire port 11 and a second voltage detecting section (FIG. 11B) for detecting the voltage of the second wire port 13. Each of the first voltage detecting section and the second voltage detecting section includes a voltage sampling circuit and a voltage processing circuit. The voltages from the first wire port 11 and the second wire port 13 are received via the voltage sampling circuit and are processed by the voltage processing circuit and then are transmitted to the main processing unit 17 as a first voltage signal and a second voltage signal respectively. The voltage processing is for example a filter processing for avoiding an error voltage. The first voltage detecting section is connected to the pin V_SN1 of the processing unit 17 and the second voltage detecting section is connected to the pin V_SN2 of the main processing unit 17. An operating signal will be output to the switch assembly 15 by the main processing unit 17 to electrically couple the first wire port 11 and the second wire port 13 if the first voltage signal in the pin V_SN1 and the second voltage signal in the pin V_SN2 are same.

Figure 12:
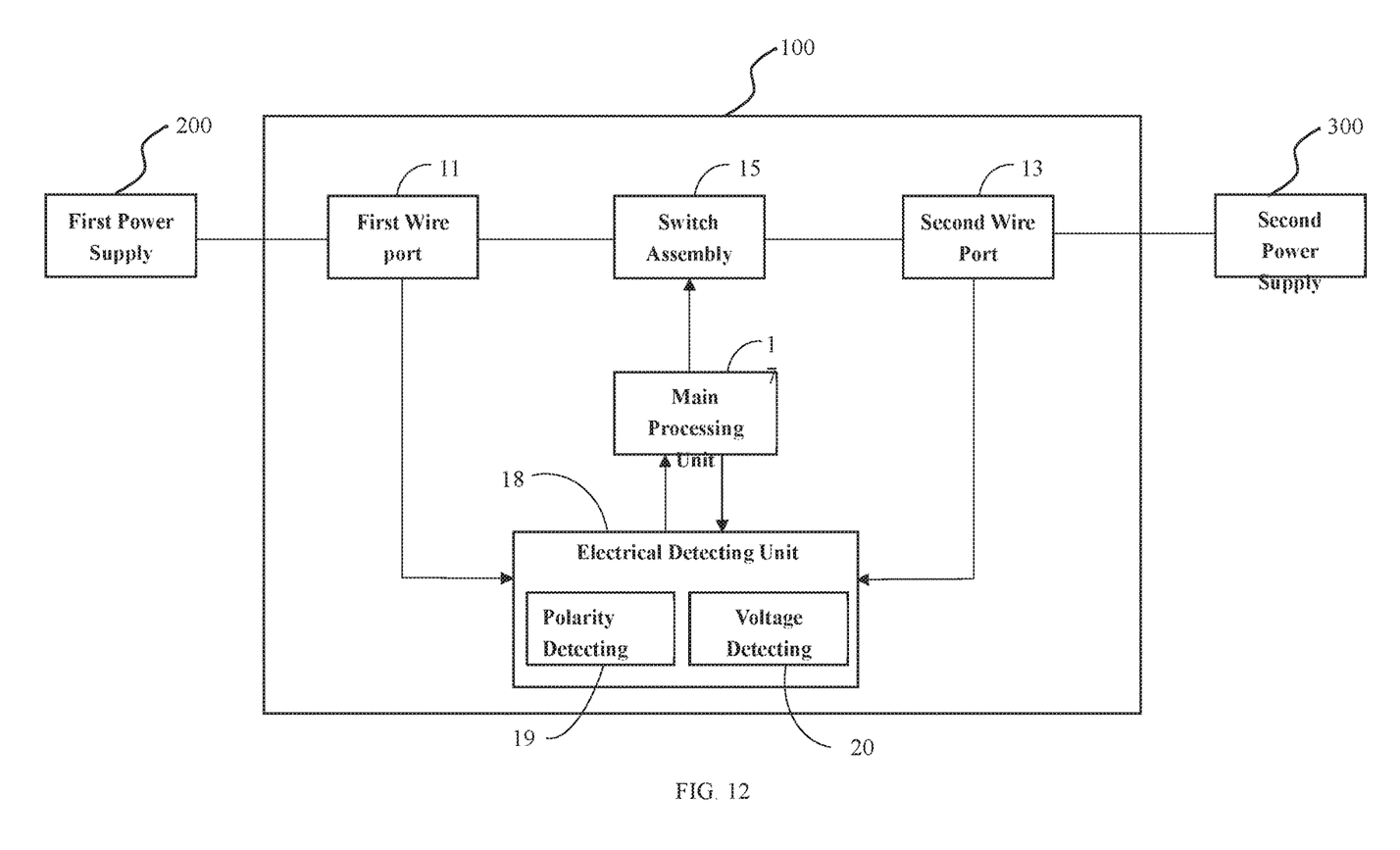
FIG. 12 is a schematic view of the electrical connection device according to a fourth embodiment of the present invention.

FIG. 12 shows a fourth embodiment of the electrical connection device according to the invention. Compared with the embodiments previously explained, the electrical connection device 100 of FIG. 12 is provided with an electrical characteristics detecting unit 18. Said electrical characteristics detecting unit 18 comprises both the polarity detecting unit 19 and the voltage detecting unit 20. The polarity detecting unit 19 and the voltage detecting unit 20 may have the same configuration as aforementioned. When the electrical connection device is used to couple the first power supply 200 to the second power supply 300, the voltage detecting unit 20 detects the voltage of the first wire port 11 and a second electrical wire port 13 and send the voltage detection signals to the main processing unit 17. Thereafter, if the main processing unit 17 determines the voltages of the first wire port 11 and the second wire port 13 are in the same predetermined range, an operating signal is sent to the polarity detecting unit 19 to detect the first polarity between the terminal and the second terminal and the second polarity between the third terminal and the forth terminal. Finally, the main processing unit 17 sends a control signal to the switch assembly 17 according to the polarity signals to couple or uncouple the first wire port 11 to the second wire port 13, as previously described on other embodiments.

Alternatively, in the fourth embodiment, it conducts polarity detection firstly by the polarity detecting unit 19, and then conducts the voltages detection by the the voltage detecting unit 20.

It can be understood that, the electrical connection device 100 of FIG. 12 ensures that the power supplies 200 and 300 have matching voltages and correct polarity connection, and thus provides more comprehensive protection. Of course, the electrical detection unit 18 may also be provided with other circuitry for detecting other electrical characteristic of the first connection port 11 and the second wiring port 13 to meet the more needs.

It should be noted that, although several units or sub-units of the electrical connection device have been described in the previous paragraphs, such division is exemplary and not mandatory. Practically, according to the embodiments of the present application, the functions and features of two or more modules described above may be embodied in one module. Conversely, the function and feature of any one unit described above may be embodied in two or more units.

Other variations to the disclosed embodiments can be understood and effected by those skilled in the art in practicing the claimed invention, from a study of the drawings, the application, and the appended claims. In the claims, the word "comprising" does not exclude other elements or steps, and the indefinite article "a" or "an" does not exclude a plurality. Any reference signs in the claims should not be construed as limiting the scope. The scope and spirit of the present application is defined by the appended claims.

What is claimed is:

1. An electrical connection device, comprising:
    a first wire port operable to be coupled to a first power supply;
    a second wire port operable to be coupled to a second power supply;
    a switch assembly electrically coupled between the first wire port and the second wire port, the switch assembly is operable to connect or disconnect an electrical connection between the first wire port and the second wire port;
    a voltage detecting unit configured to detect the voltage of the first power supply and the voltage of the second power supply and generate a first voltage signal and a second voltage signal respectively;
    a main processing unit configured to receive the first voltage signal and the second voltage signal and, when the first voltage signal and the second voltage signal are in the same predetermined voltage range of between 14.4V to 25.4V or between 8.1V to 12.7V, output a corresponding operating signal to control the switch assembly; and
    a polarity detecting unit;
    wherein the first wire port includes a first terminal and a second terminal, the second wire port includes a third terminal and a fourth terminal;
    wherein the corresponding operating signal enables the polarity detecting unit to detect a first polarity between the first terminal and second terminal and a second polarity between the third terminal and the fourth terminal and generate a first polarity signal and a second polarity signal respectively;
    wherein the first power supply is an onboard power unit of a vehicle engine and the second power supply is an external power supply, wherein the external power supply may provide electricity to the onboard power unit;
    an ignition detecting unit configured to detect an ignition of the vehicle engine and generate an ignition signal to the main processing unit; and
    wherein the main processing unit is configured such that, when the first wire port is coupled electrically to the second wire port via the switch assembly and the ignition signal is detected, the main processing unit outputs a control signal to the switch assembly to keep the electrical coupling between the first wire port and the second wire port.

2. The electrical connection device according to claim 1, further comprising an indication circuit;
    wherein the main processing unit is configured to control the indication circuit to send an alarm when the first voltage signal and the second voltage signal are not in the same predetermined voltage range.

3. The electrical connection device according to claim 2, wherein the indication circuit comprises a warning light and/or a buzzer.

4. The electrical connection device according to claim 1, wherein the corresponding operating signal enables the switch assembly to couple electrically the first wire port to the second wire port.

5. The electrical connection device according to claim 1, wherein the switch assembly comprises a first switch operable to selectively couple the first terminal to the third terminal or the fourth terminal, a second switch operable to couple the second terminal to the third terminal and a third switch operable to couple the second terminal to the fourth terminal; and     wherein the main processing unit is configured to receive the first polarity signal and the second polarity signal to control the first switch, the second switch and the third switch.

6. The electrical connection device according to claim 5, wherein the main processing unit is further configured to:

send a control signal to the switch assembly to couple the first terminal and the second terminal to the third terminal and the fourth terminal respectively when the first polarity is identical with the second polarity; and     send a control signal to the switch assembly to couple the first terminal and the second terminal to the fourth terminal and the third terminal respectively when the first polarity is different from the second polarity.

7. The electrical connection device according to claim 5, wherein the first switch, the second switch and the third switch are relays, and the switch assembly further comprises driving units for operating the first switch, the second switch and the third switch.

8. The electrical connection device according to claim 1, wherein the main processing unit is configured such that, when the first wire port is coupled electrically to the second wire port via the switch assembly but no ignition signal is detected, the main processing unit outputs a control signal to the switch assembly to maintain the electrical coupling between the first wire port and the second wire port for a first time period, disconnect the electrical coupling for a second time period, and then resume the electrical coupling.

9. The electrical connection device according to claim 8, wherein the first time period is no less than three seconds and the second time period is less than one second.

10. The electrical connection device according to claim 8, wherein the main processing unit is further configured to, during the second time period or after the second time period but before resuming the electrical coupling, receive newly detected first polarity signal and second polarity signal from the polarity detecting unit to control the switch assembly.

\* \* \* \* \*